(12) United States Patent
Peck

(10) Patent No.: US 7,281,352 B2
(45) Date of Patent: Oct. 16, 2007

(54) COLLAPSIBLE PLANT STAND

(76) Inventor: Walter L Peck, 11096 Central Ave., Montclair, CA (US) 91763

( * ) Notice: Subject to any disclaimer, the term of this patent is extended or adjusted under 35 U.S.C. 154(b) by 0 days.

(21) Appl. No.: 09/682,048

(22) Filed: Jul. 13, 2001

(65) Prior Publication Data
US 2002/0029518 A1    Mar. 14, 2002

Related U.S. Application Data

(60) Provisional application No. 60/231,694, filed on Sep. 11, 2000.

(51) Int. Cl.
*A01G 9/12* (2006.01)
*A01G 17/06* (2006.01)
*A01G 17/14* (2006.01)

(52) U.S. Cl. .............. 47/47; 47/44; 47/45; 248/153; 248/175

(58) Field of Classification Search ............ 24/11 M, 24/11 S, 614, 615, 618; 47/28.1, 41.11, 41.12, 47/44, 45, 46, 47, 66, 67, 70, 82, 83; 52/646, 52/649.4; 81/486; 211/166; 220/6, 7, 489; 242/318; 248/27.8, 153, 156, 175, 302, 213.2; 254/10.5

See application file for complete search history.

(56) References Cited

U.S. PATENT DOCUMENTS

| 760,879 | A | * | 5/1904 | Kunzman | 47/47 |
| 903,986 | A | * | 11/1908 | Klahn et al. | 47/47 |
| 2,051,596 | A | * | 8/1936 | Harbaugh | 47/29.5 |
| 3,397,485 | A | * | 8/1968 | Peterson | 47/47 |
| 3,627,242 | A | * | 12/1971 | Vandermast | 248/97 |
| 4,019,280 | A | * | 4/1977 | Summers | 47/45 |
| 4,503,636 | A | * | 3/1985 | Stuckey | 47/44 |
| 5,179,799 | A | * | 1/1993 | Hillestad | 47/45 |
| 5,423,148 | A | * | 6/1995 | Thornhill | 47/58.1 |
| 5,473,839 | A | * | 12/1995 | Stidham | 47/47 |
| 6,453,606 | B1 | * | 9/2002 | Shulman et al. | 47/47 |

* cited by examiner

Primary Examiner—Bret Hayes
(74) Attorney, Agent, or Firm—Michael L. Greenberg, Esq.; Greenberg & Lieberman, LLC

(57) ABSTRACT

A folding plant and vine supporter that has rings of different diameters which are attached to four identical vertical supports. When fully assembled, the rings are horizontal or situated perpendicular to the vertical supports. The vertical supports provide four equidistant focal points, which maintain the rings in a horizontal position. Each ring rests at a level along the vertical support. The ring with the smallest diameter is the lowermost ring or the ring closest to the ground. The ring with the largest diameter is the uppermost ring or the ring furthest away from the ground. The rings increase in diameter as the distance from the ground increases. Each ring has a ridge around the inside circumference to stabilize the plant support in the assembled position. The rings resist upward movement.

1 Claim, 3 Drawing Sheets

COLLAPSIBLE PLANT STAND

CROSS REFERENCE TO RELATED APPLICATIONS

Priority is hereby claimed to provisional patent application No. 60/231,694 filed on Sep. 11, 2000.

BACKGROUND OF INVENTION

One of the most versatile tools in gardening is plant stands, which are easy to assemble, and tough enough to provide adequate support to a plant throughout the growing season. There are existing plant supports on the market that support vines in a vertical fashion, but as will be shown; none meet all the needs of avid gardeners. Many existing art, are intended only for use with a potted plant, and would not function as a support for earth embedded plants. Existent are many tie off methods, in which the vine is tied to a stake or pole. An obvious problem with this method exists in the possibility of cutting off chloroform flow to the ends of the plant that is tied, thereby, cutting down production of the plant, and possibly killing the plant all together. The tie off methods also do not give the support and protection, as do enclosure supports. Additionally many existing enclosure supports are not collapsible, and are not intended to last more than one growing season.

U.S. Pat. No. 4,026,068 issued to Tepper on May 31, 1977 shows a tomato support stand. Tepper's invention is unlike the present invention because it is not conical; in shape, does not have rings as a support to the vines, and is not collapsible.

U.S. Pat. No. 4,519,162 issued to Stuckey on May 28, 1985 shows a vertical plant support with horizontal hoops. Stuckey's invention is unlike the present invention because it has only one vertical support, the rings are of the same diameter, it is made of steel, and it is not collapsible.

U.S. Pat. No. 4,631,861 issued to Wuthrich on Dec. 30, 1986 shows a combination pot and trellis. Wuthrich's invention is unlike the present invention because it is a planting pot with attached trellis, is not collapsible, and is not functional as a separate trellis for plants embedded in the earth.

U.S. Pat. No. 4,860,489 issued to Bork on Aug. 29, 1989 shows an adjustable plant support. Bork's invention is unlike the present invention because there are two pole supports and a spiral internal member, instead of several separate rings, the spiral member is the same diameter throughout Bork's invention, and it is not conical in shape.

U.S. Pat. No. 4,914,857 issued to Dodgen on Apr. 10, 1990 shows a tomato vine-supporting device. Dodgen's invention is unlike the present invention because it is not conical, is not collapsible, and has an exterior ring that circumscribes the invention while hanging on hook extensions.

U.S. Pat. No. 760,789 issued to Kunzman on May 24, 1904 shows a plant support. Kunzman's invention is unlike the present invention because it is not conical in shape, the rings are not one congruous piece, and the rings are of the same diameter to one another.

U.S. Pat. No. 5,323,559 issued to Allman on Jun. 28, 1994 shows a collapsible plant support. Allman's invention is unlike the present invention because it is not conical in shape, has polygonal rings, instead of circular rings, and the polygonal members are all of the same diameter to one another.

U.S. Pat. No. 5,440,834 issued to Kleinert on Aug. 15, 1995 shows a single fastener plant support ring for use with a T-shaped upright post. Kleinert's invention is unlike the present invention because, it has a single ring attachment, is not collapsible, is not conical in shape, and does not provide a plurality of support points.

U.S. Pat. No. 5,450,691 issued to Christie, et al. on Sep. 19, 1995 shows a support for plants and the like. Christie's invention is unlike the present invention, because it has a ring attachment at the uppermost point that is not congruous with other rings, it is not collapsible, and although it is conical in shape the lesser diameter is intended to be at the top of the invention instead of the base as in the present invention.

U.S. Pat. No. 5,544,446 issued to Benson on Aug. 13, 1996 shows a collapsible and adjustable plant support and protector. Benson's invention is unlike the present invention because it is a polygonal enclosure for plants, does not have a conical shape, does not have rings increasing in diameter and is not intended as a vine support, but rather a pen enclosure for a variety of plants.

U.S. Pat. No. 5,595,019 issued to Foreman on Jan. 21, 1997 shows a plant support. Foreman's invention is unlike the present invention because it has a center support that protrudes from the ground, there is a larger gap in the center region between the two middle rings of the support, and it is not collapsible in nature.

Therefore a need has been established for a conical support for vines, and the like, that is collapsible, and embeds in the earth.

SUMMARY OF INVENTION

The present invention is a folding plant and vine supporter. It has rings of different diameters that are attached to four identical vertical supports. When fully assembled, the rings are horizontal or situated perpendicular to the vertical supports. The vertical supports provide four equidistant focal points that maintain the rings in a horizontal position. Each ring rests at a level along the vertical support. The ring with the smallest diameter is the lowermost ring or the ring closest to the ground. The ring With the largest diameter is the uppermost ring or the ring furthest away from the ground. The rings increase in diameter as the distance from the ground increases.

Each ring has a ridge around the inside circumference to stabilize the plant support in the assembled position. The rings resist upward movement.

Each vertical support has a depression or retaining joint that retains or houses an edge of a ring. Each vertical support has depression sites at various levels along its length for each ring.

To fully assemble the invention, the rings are snapped into the depression sites. The vertical supports are positioned at four equidistant points along the circumference of the rings, which maintains the horizontal integrity of the rings.

Each vertical support fans out at an angle that accommodates the increasing diameter of each ring. The lower end of the vertical support has a wide base for plants, which adds stability to the stand. The lower end of each vertical support has a bend and a short horizontal component with another bend and a short vertical component. The short vertical component is the portion of the stand that is inserted into the ground. The short vertical component ends in a point that facilitates placement of the stand into the ground. Placing pressure on the short horizontal component also facilitates placement of the stand into the ground. The stand can be inserted into the ground to a depth of at least 4.5 inches. The short horizontal and short vertical components reduce toppling and increase lateral stability.

To collapse the stand, the vertical supports are pulled together. The vertical supports slide along the rings until each support is touching or is adjacent to the other. This reduces the four focal points needed for horizontal integrity of the rings to one focal point. With one focal point, each ring folds downward while remaining attached to the vertical supports through the depression sites. The collapsed stand is compact or smaller in size making for easy storage. The collapsed stand is also easier to carry around.

The plant stand is made of a durable plastic, which resists bending, breaking, and outdoor elements. This stand will not rust and is built to last.

Accordingly, it is the object of this invention to provide a plant stand that reduces toppling of a plant or vine. Further, it is the object of this invention to provide a collapsible plant stand. Also, it is the object of this invention to provide a stand, which folds and stores easily. It is also the object of the invention to provide a durable stand that is recyclable.

DETAILED DESCRIPTION

Figure 1:
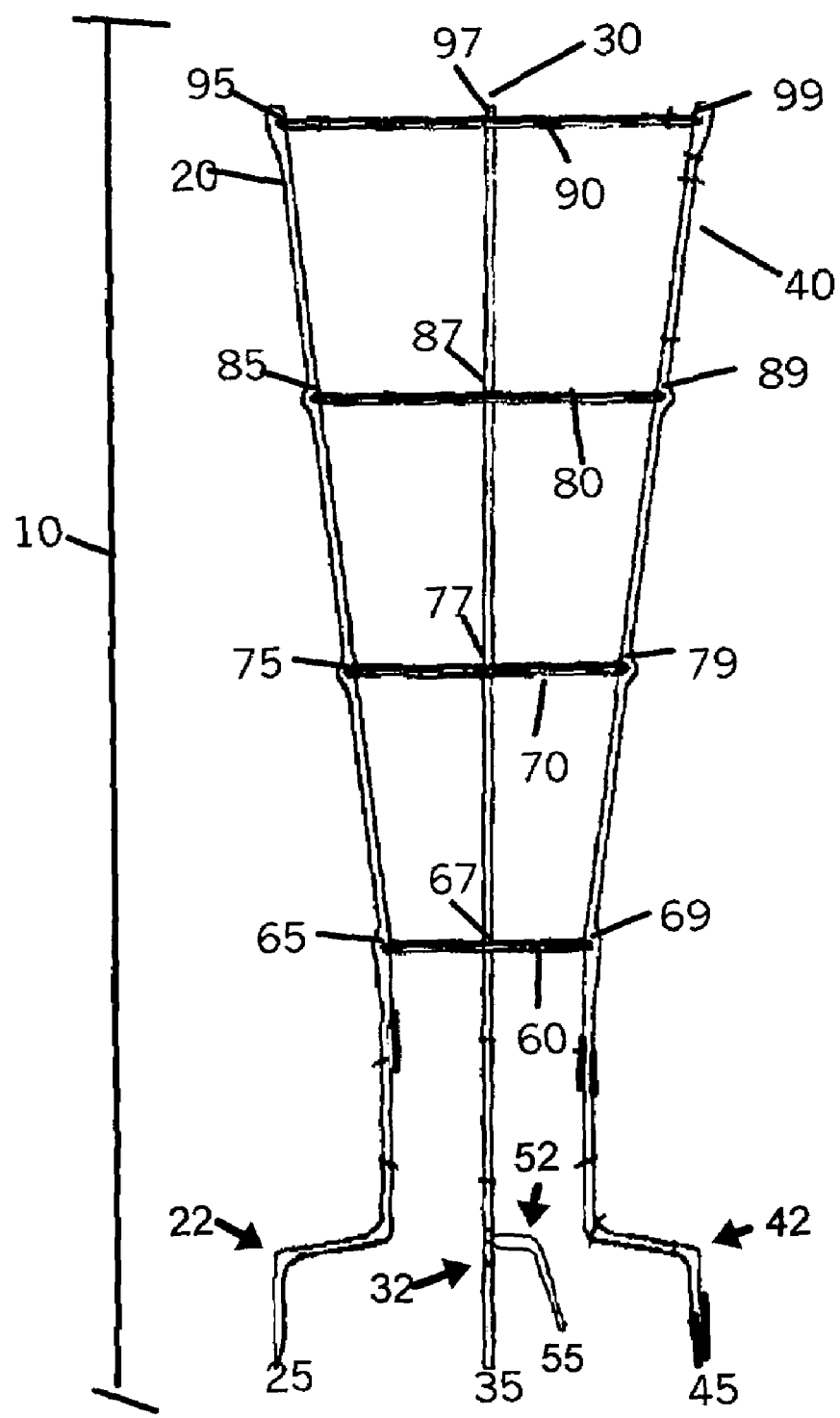
FIG. 1 shows a side view of the present invention as fully assembled.

The present invention (10) is a collapsible plant stand. It has four vertical supports (20,30,40,50) and concentric rings (60, 70, 80,90). The four vertical supports (20,30, 40,50) have insertion points (25,35,45,55) for insertion of the present invention (10) to the ground (not shown). There are four bends (22,32,42, 52 not shown) in each of the vertical supports (20,30,40,50) to stabilize the supports in the ground (not shown). The four concentric rings (60, 70, 80,90) have connection points (65,75,85,95) to connect to four vertical supports (20,30,40,50).

FIG. 1 shows the present invention (10) fully assembled. The first vertical support (20) has a first bend (22) and first insertion point (25). The first vertical support (20) inserts into the earth with first insertion point (25) further stabilized with first bend (22). The first bend (22) is the lowest point of the present invention (10) on the exterior of the ground (not shown). The first bend (22) acts as a flat upon which the first vertical support (20) can rest, and acts as a stabilizer for the present invention from wind, or other forces of nature. The first insertion point (25) is long enough to steadily hold the present invention (10) in place to keep the support from encroaching on the plant.

The first vertical support (20) has first set of connection points (65,75,85,95) for the four concentric rings to attach to the first vertical support (20). The first concentric ring (60) connects to the first vertical support (20) at first connection point (65), the means to be explained later. The second concentric ring (70) attaches to first vertical support (20), at second connection point (75). The third concentric ring (80) attaches to the first vertical support (20) at third connection point (85). The fourth concentric ring (90) attaches to the first vertical support (20) at fourth connection point (95). The four concentric rings (60,70,80,90) are attached by permanent means to first vertical support (20) at the four connection points (65,75,85,95 respectively). This allows for easy storage and collapsing of the present invention (10). The four concentric rings (60,70,80,90) upon disassembly collapse flat against the first vertical support (20) to provide storage for the winter or when the planting season is over.

The second vertical support (30) attaches to the four concentric rings (60,70,80,90) at second set of connection points (67,77,87,97). The second set of connection points (67,77,87,97) creates a removable attachment for the four concentric rings (60,70,80,90). The third vertical support (40) has a third set of connection points (69,79,89,99) that create a removable attachment for the four concentric rings (60,70,80,90). Additionally the fourth vertical support (50) has a fourth set of connection points (63,73,83,93) for the four concentric rings (60,70,80,90).

Figure 2:
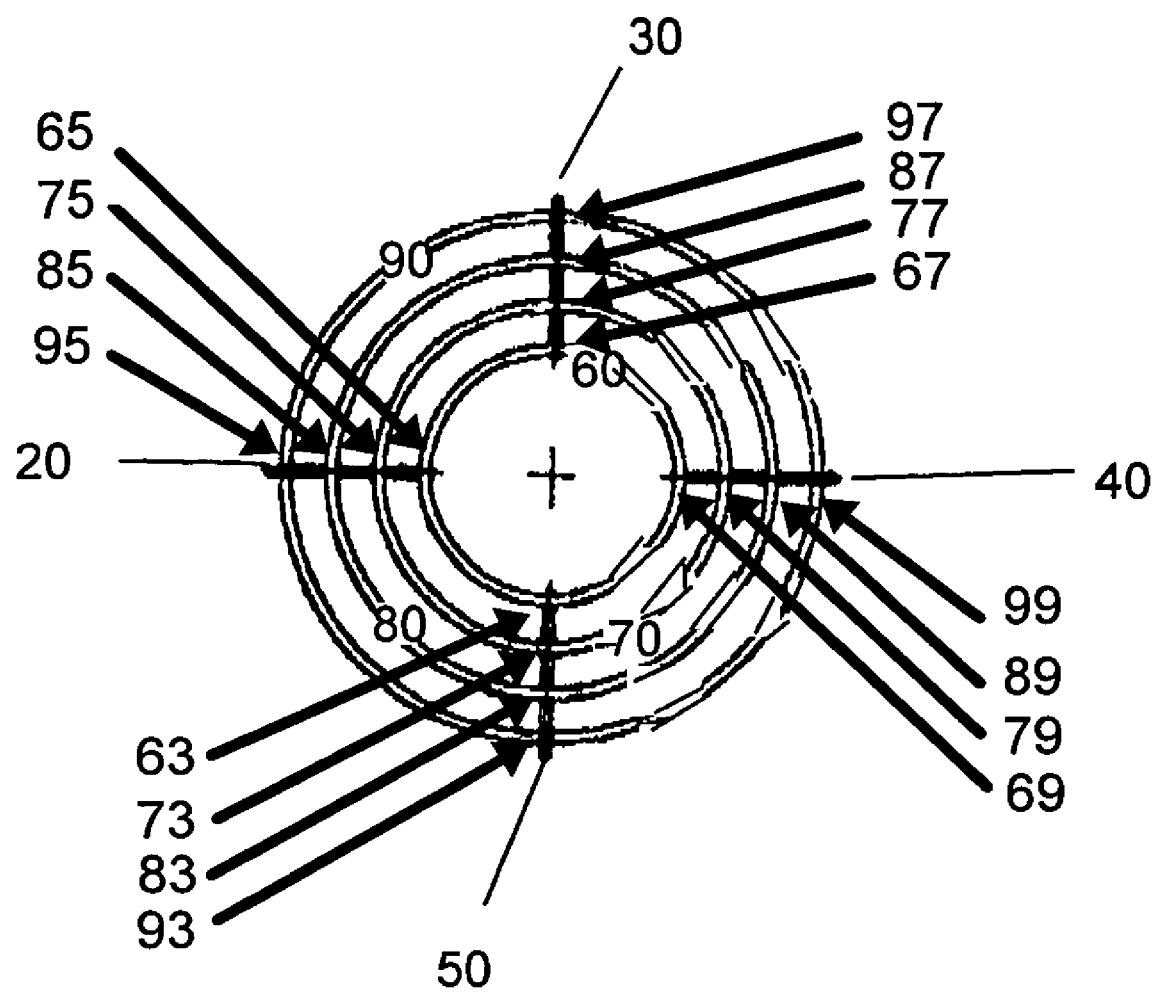
FIG. 2 shows a top view of the present invention.

FIG. 2 shows a top view of the present invention as fully assembled. As is shown, the four concentric rings (60,70, 80,90) decease in diameter from the uppermost ring (90) to the lowermost ring (60). This decrease in diameter allows the vine like plants to climb and expand from the earth (not shown), yet still be confined in the present invention (10). The increase in diameter from the lowermost ring (60) to the uppermost ring (90) allows the vine plant to grow to its full potential while still giving support.

Figure 3:
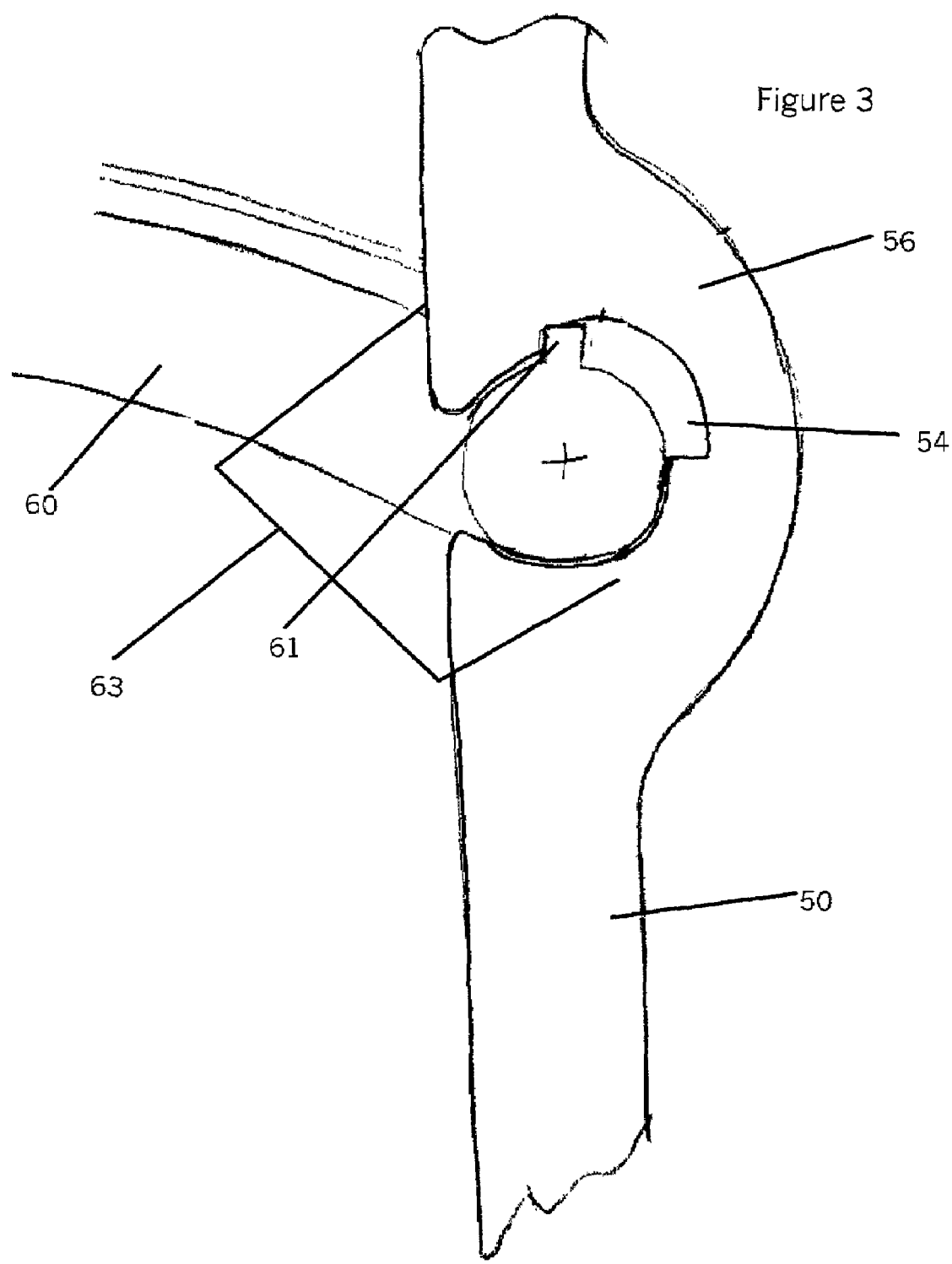
FIG. 3 shows the connection of the lowermost ring and the fourth vertical support of the present invention.

FIG. 3 shows a close up view of the connection of the lowermost ring (60), connecting the first ring (60) to the fourth vertical support (50) in a secure yet removable fashion. The fourth connection point (63) for the first ring (60) has as embodiments a ridge (61) on first ring (60). The ridge (61) communicates with the indentation (54) in fourth vertical support (50). The fourth vertical support (50) has a curve (56) to accommodate the indentation (54). As is shown, at the fourth connection point (63) the first ring (60) can be removed by turning the ridge (61) in a downward fashion to release the ridge (61) from the indentation (54). The ridge (61) holds the first ring (60) in the indentation (54) and keeps the first ring (60) from sliding or moving in the indentation (54). The ridge (61) allows the first ring (60) to be held in fixed yet removable fashion in ridge (54). It is to be understood that the second, third and fourth vertical supports (30, 40,50), have the same embodiments for hinge attachments on each of the four concentric rings (60,70,80, 90), and FIG. 3 is only one embodiment of the like hinge attachments.

It is to be understood that the present invention is a collapsible plant support as described above but is not limited thereto. It is to be understood that the present invention is not limited to the sole embodiment described above, but encompasses any and all embodiments within the scope of the following claims.

The invention claimed is:

1. A plant stand, comprising:
   at least four rings with different diameters from one another;
   at least three vertical supports, configured to slide around the circumference of said at least four rings without being disengaged from said at least four rings;
   said at least four rings configured to slide inside said at least three vertical supports and arranged in descending diameter of said at least four rings from a top of said at least three vertical supports to a bottom of said at least three vertical supports;
   a c-shaped indentation on each of said at least three vertical supports;
   a bend at the end of each of said at least three vertical supports, said bend being below said indentation; and
   at least one ridge on said at least four rings, said at least one ridge protruding from said at least four rings and said at least one ridge fitting within said c-shaped indentation on said at least three vertical supports.

* * * * *